June 20, 1950     W. C. HARRISON     2,512,151
FISHING ROD HOLDER
Filed July 1, 1949
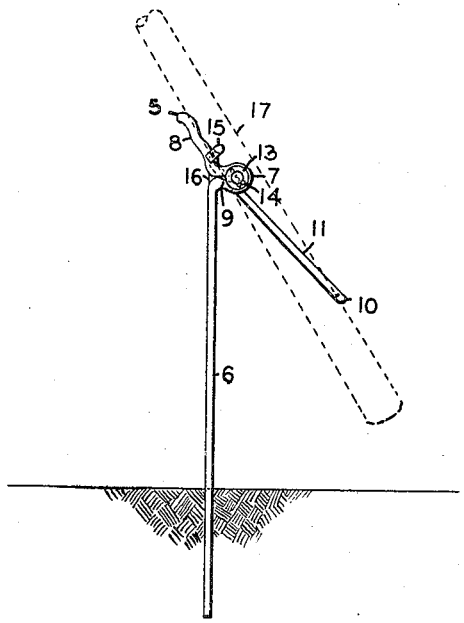
FIGURE 1.
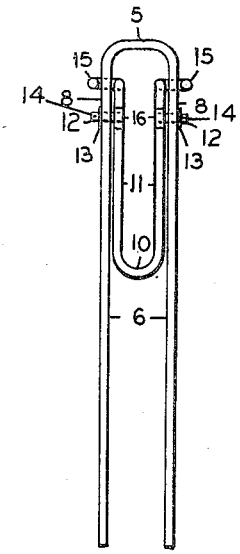
FIGURE 2.
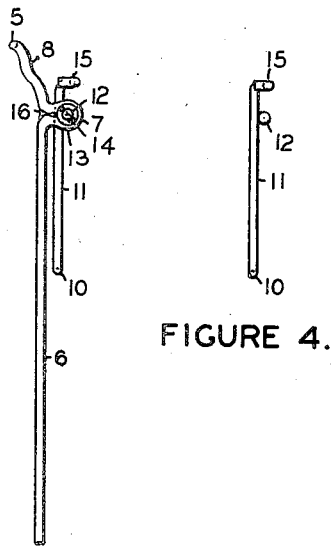
FIGURE 3.
FIGURE 4.
INVENTOR.
WILLIS CLARK HARRISON
BY
      Marvin B. Davis
      ATTORNEY Patented June 20, 1950

2,512,151

UNITED STATES PATENT OFFICE 2,512,151

FISHING ROD HOLDER

Willis Clark Harrison, Independence, Mo.

Application July 1, 1949, Serial No. 102,574

2 Claims. (Cl. 248—42)

This invention relates to an improved support for fishing rods.

The principal object of this invention is the compact collapsing feature of the comprising members for storage and transport.

Another object of this invention is to provide a fishing rod butt anchor member pivoted to a standard to swing outward to an inclined angle from the vertical standard having a rigid forward inclined member to support the forward part of a pole, and to receive stop members of the butt anchor to limit the inclination thereof.

This invention consists in the fishing rod holder and the construction, combinations and arrangements of parts hereinafter disclosed.

In the accompanying drawing, which forms part of this specification:

Figure 1 is a side view in elevation illustrating the improved fishing rod holder anchored in the ground and having a fishing rod illustrated in dotted lines anchored in the holder.

Figure 2 is a front view illustrating the collapsed fishing rod holder.

Figure 3 is a side view in elevation of Figure 2.

Figure 4 is a side view illustrating the fishing rod anchor member with the trunnion formed thereon.

My fishing rod holder comprises a vertical standard with a rod shaped member forming a U 5 with equal parallel legs 6 spaced apart. The U-shaped member 5 is spaced from the rod eye shaped members 7 by forward inclined members 8 and the eyes 9 face each other.

The fishing rod butt anchor member is formed with a U-shaped member 10 having equal legs 11 spaced apart. The legs 11 have trunnions 12 formed thereon, with the aid of welding or other methods, for pivoting in rod eye forming members 7. The trunnions 12 are secured in the eye forming members 7 preferably with washers 13 and cotter pins 14.

The ends of the legs 11 are bent to form hooks 15 to hook downward over the forward inclined members 8 while the trunnions 12 are spaced from the hooks 15 to form a limited angle of upward inclination for legs 11 preferably 45 degrees from legs 6.

The eye forming members 7 are closed with rod members 6 and 8 being pressed together and preferably welded at 16.

In the use of the anchor rod holder the standard legs 6 are pressed firmly into the ground with the U-shaped member 5 and forward inclined members 8 turned toward the river or other body of water and the butt end of a fishing pole is placed through the opening near the U-shaped member 5 and slid along the space between members 11 and anchored against the U-shaped member 10. The weight of the forward end of the fishing pole will lift the U-shaped member 10 and cause the members 11 to swing outward and upward on trunnions 12 until the hooks 15 on the ends of members 11 are pressed firmly against the forward inclined members 8.

What I claim as new and desire to secure by Letters Patent is:

1. A collapsible rod holder comprising, in combination, a U-shaped standard formed of a rod member and having equal parallel legs spaced apart, eye shaped members formed in each leg and spaced from the U portion of said rod shaped member, said eye shaped members having the openings thereof facing each other, said U portion of said rod being inclined with said legs beginning with said eye shaped members, a second U-shaped member having equal legs with the ends thereof bent to form stop members, a trunnion formed on each leg of said second member a short distance from the stop members, said trunnions journaled in said eye shaped members, said second U-shaped member having its trunnions pivoted in said eye shaped members so that the U portion of the said second member can swing outwardly approximately 45 degrees from said first parallel rods and the stop members of said second member anchoring over the first rod members and hooking thereon between the first mentioned U and said eye shaped members.

2. A collapsible rod holder comprising, a vertical supporting member, said vertical member having a journal bearing formed in the top thereof, a forward rod supporting member inclined forward from and rigid with said vertical member, a rear rod supporting member, a hook projected from the forward end of said rear rod supporting member, said rear rod supporting member being journaled in said journal bearing to swing outward from said vertical supporting member when supporting the butt end of a fishing rod, and said hook engaging said forward rod supporting member to anchor said rear supporting member in an inclined position with respect to said vertical supporting member.

WILLIS CLARK HARRISON.

No references cited.